W. H. TOWERS.
Steam Heater.
No. 87,886.  Patented March 16, 1869.
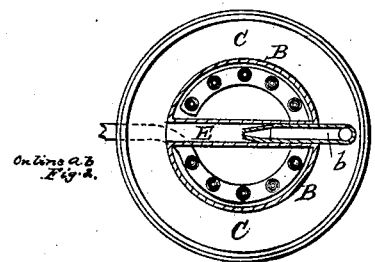
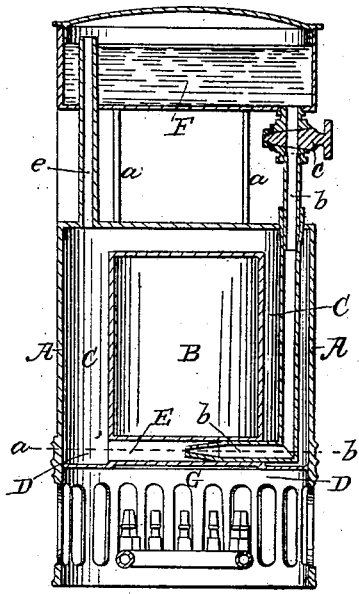
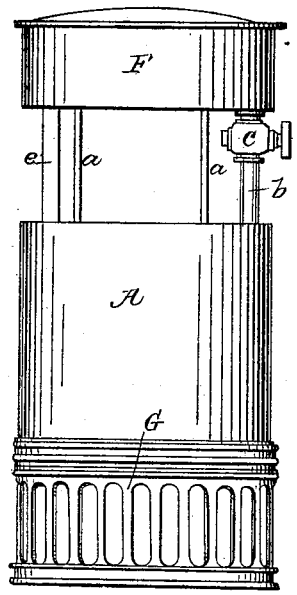
Witnesses:
Inventor:

United States Patent Office.

WILLIAM H. TOWERS, OF BOSTON, MASSACHUSETTS.

Letters Patent No. 87,886, dated March 16, 1869.

IMPROVEMENT IN STEAM-HEATING APPARATUS.

The Schedule referred to in these Letters Patent and making part of the same.

*To all to whom these presents shall come:*

Be it known that I, WILLIAM H. TOWERS, of Boston, in the county of Suffolk, and Commonwealth of Massachusetts, have made an invention of a certain new and useful Steam-Heating Apparatus; and do hereby declare the following to be a full, clear, and exact description thereof, due reference being had to the accompanying drawings, making part of this specification, and in which—

Figure 1 is a side elevation,

Figure 2, a vertical, central, and longitudinal section, and

Figure 3, a horizontal section of an apparatus embodying the features of my invention.

The invention comprising the subject-matter of these Letters Patent has reference to a class of apparatus now becoming quite general, for radiating heat for warming apartments, by the vaporizing of a small quantity of water, in a closed vessel, by the aid of an ordinary gas-burner, thus producing a portable apparatus for warming an apartment at small cost, and occupying very little space.

Heretofore, in such apparatus, the water has been converted into steam in an air-tight closed vessel, by the direct application of flame to the metal composing such vessel.

The principal objection to this construction is, first, the disagreeable odor always resulting from the direct contact of the inflamed gas upon metal, and secondly, the impossibility of permitting escape of any portion of the steam from such vessel into the apartment for the purpose of moistening the air of the same.

The object of this invention is, first, to avoid the disagreeable odor before alluded to, and secondly, to permit of escape of a portion of the vapor, varying in quantity with necessity or taste, into an apartment, a secondary object of the invention being peculiarity of construction, whereby the steam is heated, and the excess of such steam condensed and collected within a reservoir, from whence it is drawn to the vaporizing-pipe.

The invention consists in the employment of a drum, or shell, containing within it a cylinder of less capacity and closed at top, the bottom of such cylinder being open, and provided with a horizontal vaporizing-pipe, or conduit, extending across it, such conduit communicating at both ends with the annular chamber intervening between the cylinder and drum, and provided with a filling, or inlet-pipe, and being subjected to the action of heat, whereby the water allowed to enter it is instantly vaporized, such vapor or steam, as it ascends by its own pressure within the annular chamber, being heated by the heat radiated from the inner cylinder, and giving out its latent heat from the surface of the outer case, or jacket, into the apartment.

The invention further consists in the employment of a comparatively shallow vessel, surmounting the outer jacket before mentioned, and provided with an outlet-pipe, which communicates with the vaporizing-conduit before mentioned, the said vessel also communicating with the annular steam-chamber by a pipe which rises within it, nearly to the top, and through which the excess or exhaust steam flows and is condensed, the whole being as hereinafter explained.

In the drawings before alluded to as accompanying this specification, and which illustrate my invention, A denotes the outer shell, or jacket of the apparatus, closed at top, and composed of a metal capable of resisting considerable internal pressure.

Within this outer jacket is disposed a cylinder, B, of considerably less capacity, the union of the two cylinders creating an intervening annular steam-chamber, C, surrounding the said cylinder, the lower extremities of such cylinders being joined by an annular plate, D, in manner as represented.

Extending across the bottom of the inner cylinder B, is a horizontal vaporizing-conduit, E, such conduit communicating at each end with the steam-chamber C.

Surmounting the outer jacket A, is a vessel, F, supported upon such jacket by legs *a a*, &c., the vessel F being of sufficient capacity to supply the apparatus with water for a considerable length of time.

From the lower part of the vessel F, a pipe, *b*, descends through the annular chamber C, and into the vaporizing-conduit E, the purpose of such pipe being to supply the said conduit with water, the outlet, or discharging-orifice of such pipe being attenuated, or contracted into small diameter, for the twofold purpose of compelling the escape of a small quantity of water, and preventing passage of any appreciable quantity of steam to the interior of such pipe.

The pipe *b*, immediately below the vessel F, is furnished with a cock, *c*, while below such cock, and above the jacket A, the pipe may be composed of glass, in order that a person may readily see the quantity of water passing through such pipe.

A second pipe, *e*, leads upward from the upper part of the steam-chamber C, into the vessel F, and rises nearly to the top of the same, as shown in fig. 2 of the accompanying drawings.

The apparatus, thus composed, is to be mounted upon a suitable base, *g*, and within such base a gas-pipe, provided with a series of small burners, is disposed below the vaporizing-conduit E, and at such a distance therefrom as to impart the full effect of the flame from such burners to the conduit, without immediately impinging against it, a considerable portion of such heat ascending into the interior of the inner cylinder B.

In putting into practical operation the above-described apparatus, the vessel F is first to be nearly filled with water, and a suitable cover applied to it. As the water, after being converted into steam, is condensed and returned to the vessel F, little of it is lost, and a small quantity of it only will be consumed in considerable time.

It will be obvious that the amount of water consumed will vary with the amount of steam allowed to escape from the vessel F, for the purpose of moistening the air of the apartment.

The water from the vessel F, in very small quantities, or drops, is allowed to flow down the pipe b, and into the conduit E, where it is instantly vaporized, the steam thus created ascending within the annular chamber C, and in its ascent being heated by heat radiated from the circumference of the inner cylinder B, thus greatly increasing the amount of heat imparted by such steam to the outer jacket, and from thence passing, by radiation, to the apartments.

The excess of steam within the chamber C passes upward through the pipe e, and is discharged within the vessel F, where, as before observed, it is condensed and returned to the supply of water within such vessel.

The above description of the nature and operation of my invention will enable mechanics of good acquirements, or other intelligent persons, to construct and use it.

The heat imparted by it to an apartment is peculiarly soft and agreeable, and entirely free from offensive odor.

The employment of the heating inner cylinder greatly increases the heat-radiating capacity of the apparatus, while the vessel F serves the double purpose of a condenser and of permitting escape of steam to the apartment.

In a portable steam-heating apparatus for warming apartments of the class above described,

I claim—

1. The combination of a water-supply reservoir F, connecting-pipe b, a vaporizing-device, E, or its equivalent, and a steam-chamber, D, all substantially as specified.

2. In combination with the heat-radiating chamber, or cylinder, the employment of a vaporizing-conduit, essentially in manner and to operate as explained.

3. In connection with the vaporizing-conduit E, arranged as described, the water-reservoir F and the supply-pipe b, substantially in manner and for the purpose as explained.

4. In combination with the cylinders A and B, and the conduit E, arranged and operating as described, the reservoir F, with its pipes e and b, and when operating both as a condenser and as a means of supplying steam to an apartment, the whole being as before set forth and explained.

5. The general combination and arrangement of the cylinders A and B, the vaporizing-conduit E, (supplied with heat, as described,) and the reservoir F, the latter being connected with the heating-chamber D by the pipe e, and with the conduit E by the pipe b, and the whole being organized and operating as hereinbefore set forth and explained.

WM. H. TOWERS.

Witnesses:
    FRED. CURTIS,
    GEO. A. LORING.